United States Patent

Chakraborty et al.

(10) Patent No.: US 10,255,273 B2
(45) Date of Patent: Apr. 9, 2019

(54) METHOD AND SYSTEM FOR RANKING AND SUMMARIZING NATURAL LANGUAGE PASSAGES

(71) Applicant: Microsoft Technology Licensing, LLC, Redmond, WA (US)

(72) Inventors: Doran Chakraborty, San Jose, CA (US); Manish Malik, Cupertino, CA (US); Qifa Ke, Cupertino, CA (US); Jonathan R. Tiao, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/624,329

(22) Filed: Jun. 15, 2017

(65) Prior Publication Data

US 2018/0365220 A1 Dec. 20, 2018

(51) Int. Cl.
*G06F 17/27* (2006.01)
*G06N 3/04* (2006.01)
*G06N 3/10* (2006.01)

(52) U.S. Cl.
CPC ....... *G06F 17/2785* (2013.01); *G06N 3/0445* (2013.01); *G06N 3/10* (2013.01)

(58) Field of Classification Search
CPC ..................................................... G06N 3/04
USPC ........ 704/1–10, 230–257, 270–275
See application file for complete search history.

(56) References Cited

U.S. PATENT DOCUMENTS

| 6,189,002 | B1* | 2/2001 | Roitblat | G06F 17/3061 |
| 7,406,456 | B2* | 7/2008 | Calistri-Yeh | G06F 17/30731 704/9 |
| 9,400,841 | B2* | 7/2016 | Eggebraaten | G06F 17/3053 |
| 9,535,960 | B2 | 1/2017 | Guo et al. | |
| 2016/0306798 | A1 | 10/2016 | Guo et al. | |
| 2018/0150743 | A1* | 5/2018 | Ma | G06N 3/04 |

OTHER PUBLICATIONS

Padmapriya, et al., "An Approach for Text Summarization Using Deep Learning Algorithm", In Journal of Computer Science vol. 10, Issue 1, 2014, pp. 1-9.

Zhang, et al., "Multiview Convolutional Neural Networks for Multidocument Extractive Summarization", In Journal of IEEE Transactions on Cybernetics, Nov. 28, 2016, pp. 1-3.

(Continued)

*Primary Examiner* — Huyen X Vo

(57) ABSTRACT

Examples of the present disclosure describe systems and methods relating to generating a relevance score on a given natural language answer to a natural language query for ranking the answer among other answers for the query, while generating a summary passage and a likely query to the given passage. For instance, multi-layered, recurrent neural networks may be used to encode the query and the passage, along with a multi-layered neural network for information retrieval features, to generate a relevant score for the passage. A multi-layered, recurrent neural network with soft attention and sequence-to-sequence learning task may be used as a decoder to generate a summary passage. A common encoding neural network may be employed to encode the passage for the ranking and the summarizing, in order to present concise and accurate natural language answers to the query.

20 Claims, 14 Drawing Sheets

(56) References Cited

OTHER PUBLICATIONS

Yousefi-Azar, et al., "Text Summarization Using Unsupervised Deep Learning", In Journal of Expert Systems with Applications: An International Journal, vol. 68, Issue C, Feb. 1, 2017, pp. 1-15.

Yao, et al., "Automatic Document Summarization via Deep Neural Networks", In Proceedings of 8th International Symposium on Computational Intelligence and Design, Dec. 12, 2015, pp. 291-296.

Severyn, et al., "Learning to Rank Short Text Pairs with Convolutional Deep Neural Networks", In Proceedings of the 38th International ACM SIGIR Conference on Research and Development in Information Retrieval, Aug. 9, 2015, 10 pages.

Nguyen, et al., "Learning to Summarize Web Documents using Social Information", In Proceedings of IEEE 28th International Conference on Tools with Artificial Intelligence, Nov. 6, 2016, pp. 619-626.

Azar, et al., "Query-Based Single Document Summarization Using an Ensemble Noisy Auto-Encoder", In Proceedings of Australasian Language Technology, 2015, pp. 2-10.

Keikha, et al., "Evaluating Answer Passages using Summarization Measures", In Proceedings of the 37th International ACM SIGIR conference on Research & development in information retrieval, Jul. 6, 2014, 4 pages.

Goldstein, et al., "Multi-Document Summarization by Sentence Extraction", In Proceedings of the NAACL-ANLPWorkshop on Automatic summarization , vol. 4, Apr. 30, 2000, 9 pages.

Chopra, et al., "Abstractive Sentence Summarization with Attentive Recurrent Neural Networks", In Proceedings of NAACL-HLT16, Apr. 13, 2016, 6 pages.

Sculley, D., "Combined Regression and Ranking", In Proceedings of the 16th ACM SIGKDD international conference on Knowledge discovery and data mining, Jul. 25, 2010, 9 pages.

Li, et al., "Enhancing Relevance Models with Adaptive Passage Retrieval", In Proceedings of the IR research, 30th European conference on Advances in information retrieval, Mar. 30, 2008, pp. 463-471.

* cited by examiner

METHOD AND SYSTEM FOR RANKING AND SUMMARIZING NATURAL LANGUAGE PASSAGES

BACKGROUND

Computer-based question and answer systems have become widely available as use of the Internet with personal computers, mobile handhelds and other devices has become a common in daily lives. The vast amount of information on the Internet, however, may result in difficulties when a user attempts to discover certain information. For example, confusion may result if information is presented in a disorganized manner. As another example, users may become overwhelmed when too much information is presented to them.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by generating a ranking of a set of natural language answers from electronic files based on relevance to a given natural language query, by using deep-learnt neural networks. Additionally, aspects described herein may generate a pair of a likely natural language question and a natural language answer, based upon a provided natural language passage.

Examples of the present disclosure describe systems and methods related to the processing of a given pair of a natural language query and a candidate answer using recurrent, neural networks with deep learning in conjunction with neural networks designed for traditional information retrieval (IR). Additionally, both a relevance score to a given answer against a query, as well as a pair of a passage summary and a likely query from a given passage, may be generated by integrating the aforementioned neural networks with another multi-layered, recurrent neural network as a summary-question decoder.

According to the present disclosure, a pair of a natural language query and a candidate answer ranked electronic files may be encoded to generate a set of multi-dimensional semantic vector expressions by processing in respective multi-layered, recurrent neural networks. The resulting two multi-dimensional semantic vector expressions may be combined to generate a combined multi-dimensional semantic vector expression. The pair of the natural language query and the natural language candidate answer may be processed through a traditional IR neural network to generate a multi-dimensional textual vector representation of the pair. The combined semantic vector expression and the textual vector expression may be combined to generate a final relevance score of the candidate answer for the query. The final relevance score may be used to rank the candidate answer relative to other candidate answers as the most likely correct answer to the query.

According to the present disclosure, the multi-layered, recurrent neural network used to encode the answer may be employed for generating a summary of the given passage. A resultant semantic vector expression from the answer decoder may be received by a summary-query decoder to generate a natural language summary as well as a likely query for which the summary may provide an answer. For example, a multi-layered, recurrent neural network in combination with soft attention and sequence-sequence learning tasks may be used by the summary-query encoder to generate a summary passage while minimizing perplexity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Systems and methods are disclosed to generate relevance scores for natural language answers and for ranking answers to a natural language query given by a user. The systems and methods enable such functionality by using combinations of deep-learnt neural networks and recurrent neural networks. For example, queries and candidate answers may be analyzed from both semantic and textual characteristics to generate ranking scores. In addition, systems and methods are disclosed to generate a natural language passage summary and a likely natural language query to a natural language passage given by a user. Further, system and methods are disclosed to generate both a relevance score to a natural language answer against a natural language query as well as a natural language summary of the natural language answer by using a common neural network to process the natural language answer. For example, a query in a natural language may be received through user interactions on a computing device such as a smartphone or a tablet. The device may display search results by ranking answers based on their relevance to the query. In addition or alternatively, the device may display summaries of documents in the search results.

Aspects of the present disclosure relate to providing a relevance score for a pair of a query and an answer, for ranking a set of passages that are selected as answers to the query. Additional aspects of the present disclosure relates to providing a summary passage to a given passage. Still further aspects of the present disclosure relate to providing a highly efficient and scalable processing environment to leverage deep learning models to generate both relevant scores for ranking answers to a given query, as well as a pair of summary passage and an expected question to a given passage.

Figure 1:
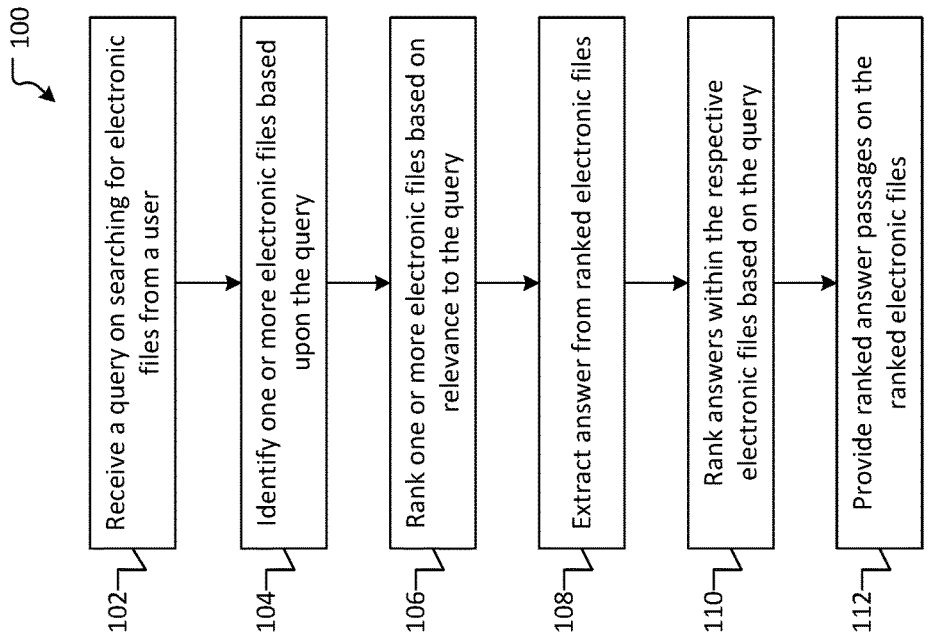
FIG. 1 illustrates a method for searching for documents.

FIG. 1 illustrates an example method for searching for documents according to the present disclosure. For instance, the method 100 may take a query from a user as an input, searches for electronic files that are relevant to the query. Then, the method 100 may provide one or more answers that are ranked in the order of relevance to the query.

At receive operation 102, a query may be received from a user via a user interface, from another application, or from other types of sources. The query may be a request to search for electronic documents. For example, there may be a query window displayed on a computing device such as a smartphone or tablet, where a user may enter the natural language query by various input methods such as, but not limited to, by use of a keyboard, speaking into a microphone that is attached to the device, or the request may be received from an application program or a web information bot, which may be executed locally or remotely on a computer network such as but not limited to the Internet.

At identify operation 104, one or more electronic files may be identified based on the query. For example, the one or more electronic files may be web pages at websites, electronic documents that are stored in a document management server, and/or files that may be used by computer application programs. Links to the identified one or more electronic files may be provided for accessing respective contents of the identified one or more electronic files.

At rank operation 106, one or more electronic files may be ranked based on relevance to the query. For example, the ranking may be determined by various search methods such as, but not limited to, an index search on web contents, a database search, and/or use of a neural network based on IR features. In aspects, the ranking may be in ascending or in descending order.

At extract operation 108, one or more answers may be extracted from at least one of the ranked electronic files. For example, the one or more answers may be extracted from the electronic files at high ranking, such as but not limited to the top 1%, 5%, 10%, and so on. Additionally or alternatively the one or more answers may be extracted from a select number of, such as but not limited to the three, five, ten, twenty and fifty highest ranked electronic files. An answer may consist of one or more complete or partial sentences extracted from an electronic file. The one or more sentences may be consecutive or non-consecutive in the electronic file. In examples, the answer may be a concatenated passage based on file property information, such as but not limited to a title, an author, an abstract, a published date, a last-modified date, and an abstract of the electronic file. Alternatively, the answer may be a copy of a pre-defined segment of the electronic file, such as but not limited to the first fifty words of the electronic file. In aspect, answers may be extracted from a select section under at least one header such as but not limited to abstract, summary, introduction and main topic. In other aspect, answers may be extracted from the ranked electronic file, or one or more number of the ranked electronic files. In yet another aspect, extracted answers may contain one or more words appearing in the query.

At rank operation 110, the one or more answers within each of the ranked electronic documents may be ranked based on the query. The ranking may be based on a relevance score that may be generated for each of the one or more answers against the query. The relevance scores may be generated by processing the pair of an answer and the query through neural networks with deep learning according to the present disclosure. In aspects the relevance scores may be generated based upon relevance in areas such as but not limited to semantic, textual, and lexical relevance between answers and the query.

At provide operation 112, ranked answers from the ranked electronic documents are provided. For example, the ranked answer may be displayed on a computing device such as a smartphone or a tablet along with a ranking of electronic files found based on the search.

As should be appreciated, operations 102-112 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 2A:
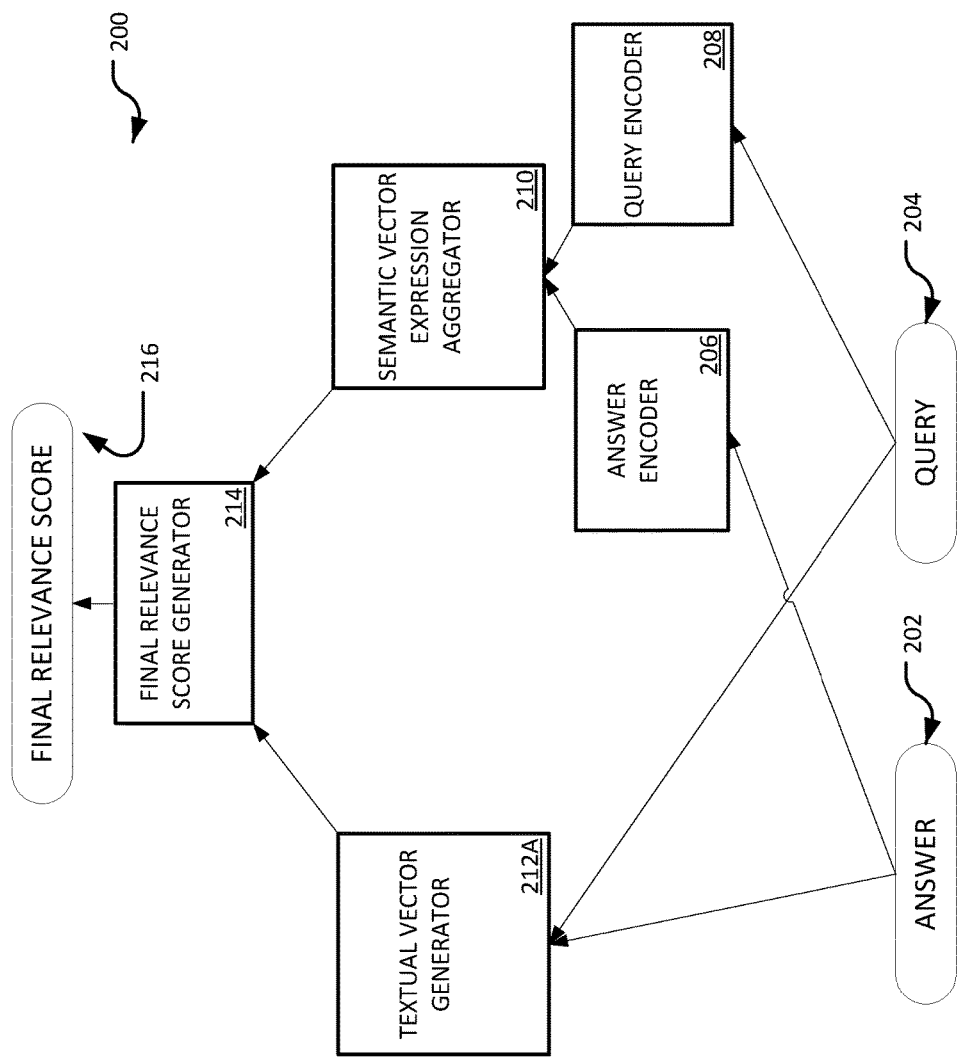
FIG. 2A illustrates an overview of an example system for generating a relevance score for ranking candidate answers.

FIG. 2A illustrates an overview of an example system for generating a relevance score for ranking answers. In aspects the system 200 may receive a pair of a query 204 and an answer 202. For instance the query 204 and the answer may be in at least one natural language. The answer 202 may be one of multiple candidate answers for the query 202. A final relevance score 216 of the answer 202 against the query 204 may be generated from the query 204 and the answer 202. The arrows represent a direction of information as being processed by respective components. While different components are described as performing different functionalities in the system 200, one of skill in the art will appreciate that more or fewer components may be utilized without departing from the scope of this disclosure. As an example, a single component may be used to encode the answer and the query.

As presented, answer encoder 206 may receive the answer 202 as a candidate answer in natural language (thereafter may be called answer) as an input. The answer encoder 206 may encode the answer 202 into a multi-dimensional semantic vector (an answer semantic vector, not shown). The answer semantic vector may represent semantics of the answer 202 in vector expression. The answer encoder 206 may send the answer semantic vector to semantic vector expression aggregator 210. In one example, the answer encoder 206 may comprise a multi-layered recurrent neural network. In other examples, the answer encoder 206 may be implemented as different types of recurrent neural network (RNN) encoders, such as but not limited to, uni-directional gated recurrent units (GRUs), bidirectional GRUs, uni-directional long short-term memory (LSTMs) and bi-directional LSTMs.

Query encoder 208 may receive a natural language query 204, and may encode the query 204 into a multi-dimensional semantic vector (a query semantic vector, not shown). The query semantic vector represents semantics of the query 204 in vector expression. The query encoder 208 may send the query semantic vector to semantic vector expression aggregator 210. In one example, the query encoder 208 may comprise a multi-layered recurrent neural network. In other example, the query encoder 208 may be implemented as different types of recurrent neural network (RNN) encoders, such as but not limited to, uni-directional gated recurrent units (GRUs), bidirectional GRUs, uni-directional long short-term memory (LSTMs) and bi-directional LSTMs. In aspect, answer encoder 206 and the query encoder 208 may each comprise their own multi-layered RNN. Alternatively, answer encoder 206 and the query encoder 208 may comprise the same multi-layered RNN.

Semantic vector expression aggregator 210 may receive respective multi-dimensional semantic vectors on the query 204 (the query semantic vector) and the answer 202 (the answer semantic vector). Semantic vector expression aggregator 210 may combine the received multi-dimensional semantic vectors to generate a combined multi-dimensional semantic vector (a combined semantic vector). For example, the aggregation may include processing the cosine similarity of the two multi-dimensional vectors to generate the combined semantic vector. In another example, the combined semantic vector may be a result of equal or weighted sum or average of the query semantic vector and the answer semantic vector.

As presented, the query 204 and the answer 202 may be received by a textual vector generator 212A. In aspects, textual vector generator 212A may be a multi-layered neural network for information retrieval (IR) based on textual features. A multi-dimensional vector (a combined textual vector) that represents textual characteristics of the query 204 and the answer 202 may be generated. For example, textual vector generator 212A may be a multi-layered neural network, which processes IR based on textual features. Textual vector generator 212 may process and identify traditional IR features, such as how well the answer 202 matches with the query 204 textually. For example, the multi-layered neural network used in textual vector generator 212A may count a number of words that appear in both the query 204 and in the answer 202. Additionally or alternatively, the multi-layered neural network may measure a frequency-inverse document frequency (TF-IDF) of words in the query 204 and in the answer 202, in order to identify with high accuracy how important a word is to the query 204 and the answer 202.

A final relevance score generator 214 may receive the combined textual vector from textual vector generator 212A and the combined semantic vector from semantic vector expression aggregator 210, and generate a final relevance score of the answer 202 with respect to the query 204. For example the final relevance score 216 may be generated based on a weighted combination of the two multi-dimensional vectors. In another example, the final relevance score may be generated based on an ordinary or weighted average of coefficients of respective vector dimensions. In aspects a final relevance score may be used to rank answers to a query based on relevance from both textual and semantic perspectives.

As should be appreciated, the various methods, devices, components, etc., described with respect to FIG. 2A are not intended to limit the systems and methods to the particular components described. Accordingly, additional topology configurations may be used to practice the methods and systems herein and/or some components described may be excluded without departing from the methods and systems disclosed herein.

Figure 2B:
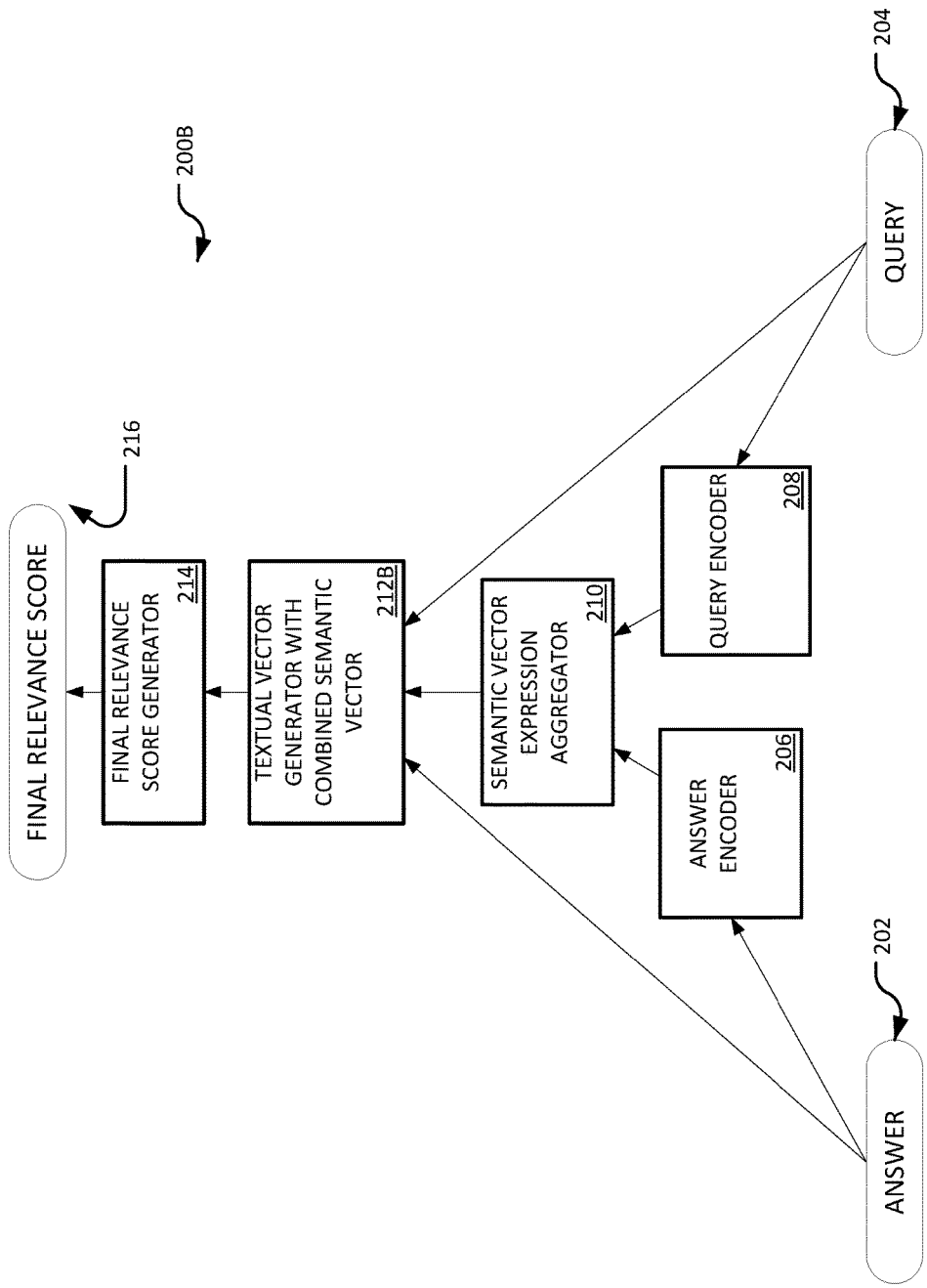
FIG. 2B illustrates an overview of an example system for generating a relevance score for ranking candidate answers.

FIG. 2B illustrates an overview of an example system 200B for generating a relevance score for ranking candidate answers. In aspects the system 200B may receive a pair of a query 204 and an answer 202. For instance the query 204 and the answer may be in at least one natural language. The answer 202 may be one of candidate answers for the query 202. A final relevance score 216 of the answer 202 against the query 204 may be generated. The arrows represent a direction of information as being processed by respective components. While different components are described as performing different functionalities in the system 200B, one of skill in the art will appreciate that more or fewer components may be utilized without departing from the scope of this disclosure. As an example, a single component may be used to encode the answer and the query.

As presented, answer encoder 206 may receive the answer 202 in natural language (thereafter called answer) as an input. The answer encoder 206 may encode the answer 202 into a multi-dimensional semantic vector (an answer semantic vector, not shown). The answer semantic vector may represent semantics of the answer 202 in vector expression. The answer encoder 206 may send the answer semantic vector to semantic vector expression aggregator 210. In one example, the answer encoder 206 may comprise a multi-layered recurrent neural network. In other example, the answer encoder 206 may be implemented as different types of recurrent neural network (RNN) encoders, such as but not limited to, uni-directional gated recurrent units (GRUs), bidirectional GRUs, uni-directional long short-term memory (LSTMs) and bi-directional LSTMs.

Query encoder 208 may receive a natural language query 204, and may encode the query 204 into a multi-dimensional semantic vector (a query semantic vector, not shown). The query semantic vector represents semantics of the query 204 in vector expression. The query encoder 208 may send the query semantic vector to semantic vector expression aggregator 210. In one example, the query encoder 208 may comprise a multi-dimensional recurrent neural network. In other example, the query encoder 208 may be implemented as different types of recurrent neural network (RNN) encoders, such as but not limited to, uni-directional gated recurrent units (GRUs), bidirectional GRUs, uni-directional long short-term memory (LSTMs) and bi-directional LSTMs. In aspect, answer encoder 206 and the query encoder 208 may each comprise their own multi-layered RNN. Alternatively, answer encoder 206 and the query encoder 208 may comprise the same multi-layered RNN.

Semantic vector expression aggregator 210 may receive respective multi-dimensional semantic vectors on the query 204 (the query semantic vector) and the answer 202 (the answer semantic vector). Semantic vector expression aggregator 210 may combine the received multi-dimensional semantic vectors to generate a combined multi-dimensional semantic vector (a combined semantic vector). For example, the aggregation may include processing the cosine similarity of the two multi-dimensional vectors to generate the combined semantic vector. In another example, the combined semantic vector may be a result of equal or weighted sum or average of the query semantic vector and the answer semantic vector.

As presented, the query 204, the answer 202, and the combined semantic vector may be received by a textual vector generator with a combined semantic vector as input (VG-CSV) 212B. In aspects, VG-CSV 212B may be a multi-layered neural network for IR based on textual features. VG-CSV 212B may generate a multi-dimensional vector that represents textual characteristics of the query 204 and the answer 202 as well as semantic characteristics of the query 204 and the answer 202 as fed by the combined semantic vector. For example, VG-CSV 212B may consist of a multi-layered neural network (NN), which may process and identify traditional IR features, such as how well the answer 202 matches with the query 204 textually, while accommodating the combined semantic vector as among input to the neural network. For example, the multi-layered neural network used in VG-CSV 212B may count a number of words that appear in both the query 204 and in the answer 202. Additionally or alternatively, the multi-layered neural network may measure a frequency-inverse document frequency (TF-IDF) of words in the query 204 and in the answer 202, in order to identify with high accuracy how important a word is to the query 204 and the answer 202.

In the present disclosure, the system to generate a relevance score for ranking answers may be agnostic with respect to the depth of the one or more multi-layered neural networks described herein. Additionally or alternatively, in the present disclosure, the system to generate a relevance score for ranking answers may be agnostic with respect to the depth of dimensions of the vectors in the neural networks.

The multi-layered, recurrent neural networks in the present disclosure may be trained using at least two types of information. The first type of information may be a pair of query and answer labeled by a human, with binary labels (e.g., correct or incorrect) or labels spanning different states (e.g. perfect, excellent, good, fair and bad). A label in "perfect" state may indicate a situation where a human perception indicates that an answer is the precise answer to the query. The states "bad" may indicate the opposite end of the scale. The other states are positioned between the two extreme states as appropriate. The second type of information may be based on query logs from a computer-implemented question and answer system. The second type of information may include different states. One example state is a "good" state, where the answer has satisfied a user according to the log. Another exemplary state may be an "abandonment" state, where the user has abandoned the answer because the user is not satisfied by the answer according to the log. In associating the two types of information, a pair of query and answer with status "perfect" in the first type may be associated with "good" in the second type. A pair of query and answer with status "bad" in the first type may be associated with "abandonment" in the second type.

In aspects of the present disclosure, training the system may include use of pair-wise logistic regression functions, where a difference (or a distance) of states between two pairs of query-answer may be reflected in training relevance scores to respective pairs. A bias may be used such that scores with a greater difference are assigned to a particular two pairs if a difference of states for the two pairs is greater than other pairs.

As should be appreciated, the various methods, devices, components, etc., described with respect to FIG. 2B are not intended to limit the systems and methods to the particular components described. Accordingly, additional topology configurations may be used to practice the methods and systems herein and/or some components described may be excluded without departing from the methods and systems disclosed herein.

Figure 3A:
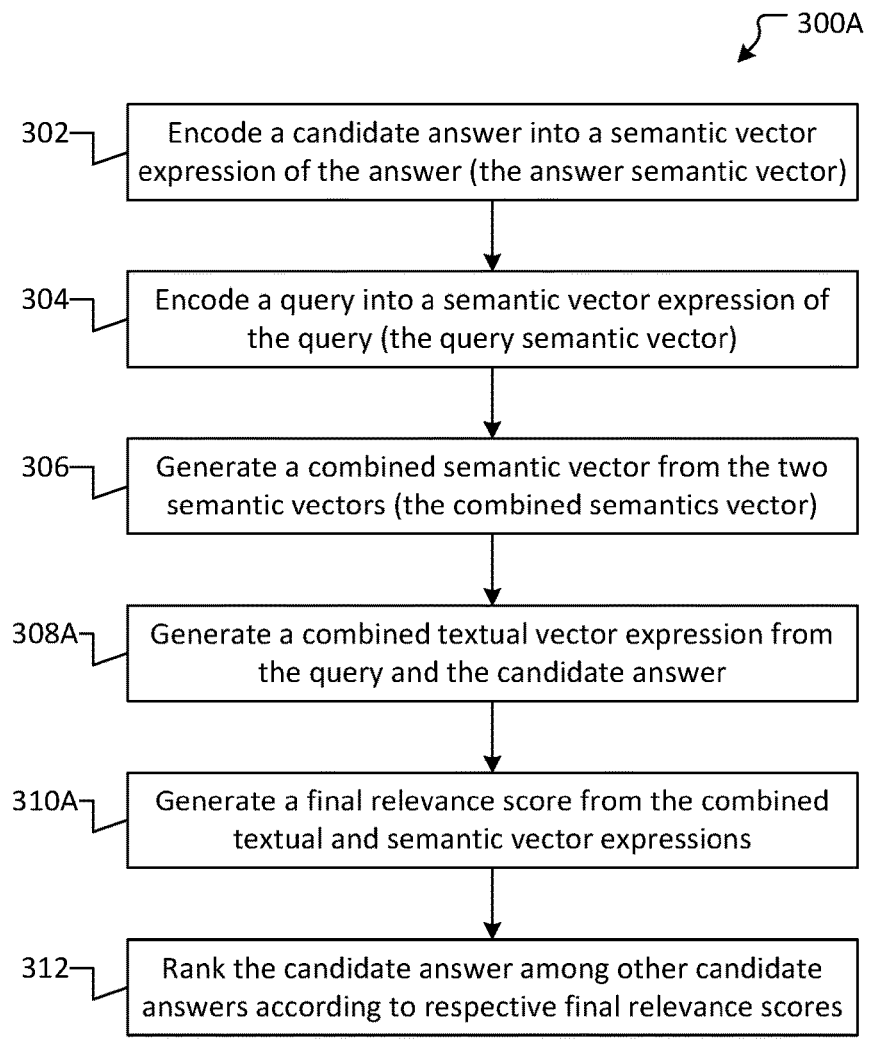
FIG. 3A illustrates a method for ranking candidate answers.

FIG. 3A illustrates a method 300A for ranking candidate answers based on a collection of the candidate answers against a query. The method 300A may be performed by one or more computing systems. For example, the operations of the method 300A may be performed by a client device, one or more server devices, or a combination of client and server devices.

At encode operation 302, a natural language candidate answer may be encoded into a semantic vector expression of the candidate answer. For example, a multi-layered RNN may be used to receive the candidate answer for encoding by processing with respect to semantics of the candidate answer. For example, a multi-layered RNN used in summary-query decoder 402 may be based on uni-directional GRUs, bidirectional GRUs and uni-directional LSTMs. A common multi-layered RNN may be shared encoding the candidate answer and the query to generate respective semantic vectors. Alternatively, a separate set of multi-layered RNN may be used to generate semantic vector expressions of the candidate answer and the query.

At encode operation 304, a natural language query may be encoded into a semantic vector expression of the query. For example, a multi-layered RNN may be used to receive the query for encoding by processing with respect to semantics of the query. For example, a multi-layered RNN used in summary-query decoder 402 may be based on uni-directional GRUs, bidirectional GRUs and uni-directional LSTMs. A common multi-layered RNN may be shared encoding the candidate answer and the query to generate respective semantic vectors. Alternatively, separate multi-layered RNNs may be used.

At generate operation 306, the answer semantic vector from the encoding operation 302 and the query semantic vector from the encoding operation 304 may be combined to generate a combined semantic vector expression of the two semantic vector expressions. For example, a cosine similarity may be processed for the two semantic vector expressions. In another example, equal or weighted sum or average of the two semantic vector expressions may be used to generate a combined semantic vector expression. In generating the combined semantic vector, at least one dimension or all of the multiple dimensions of the answer semantic vector and the query semantic vector may be combined.

At generate operation 308A, a textual vector expression may be generated from the natural language query and the natural language candidate answer. For example, a multi-layered neural network (NN) may be used to generate traditional IR features based on textual analysis. The textual vector expression may be a multi-dimensional vector. The multi-layered neural network may measure a frequency-inverse document frequency (TF-IDF) of words in the query 204 and in the answer 202, in order to identify with high accuracy how important a word is to the query 204 and the answer 202.

At generate operation 310A, a final relevance score for the answer may be generated from the textual and semantic vector expressions. For instance, the final relevance score is generated by combining the textual vector and the combined semantic vector. The textual vector may be generated at generate operation 308A by using the traditional IR features for the pair of the query and the candidate answer. The combined semantic vector may be generated at generate operation 306, by combining the answer semantic vector from encode operation 302 and the query semantic vector from the encoding operation 303. For example, a high final relevance score for an answer may indicate a high relevance of the answer against the query. The final relevance score may be a weighted combination of the textual vector expression and the combined semantic vector expression.

At rank operation 312, the candidate answer may be ranked among other candidate answers against the query according to respective final relevance scores. For example, there may be a set of multiple candidate answers for a query. There may be a relevance scores for each of the candidate answers. These answers may be ranked in the order of corresponding relevance scores.

As should be appreciated, operations 302-312 in FIG. 3A are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3B:
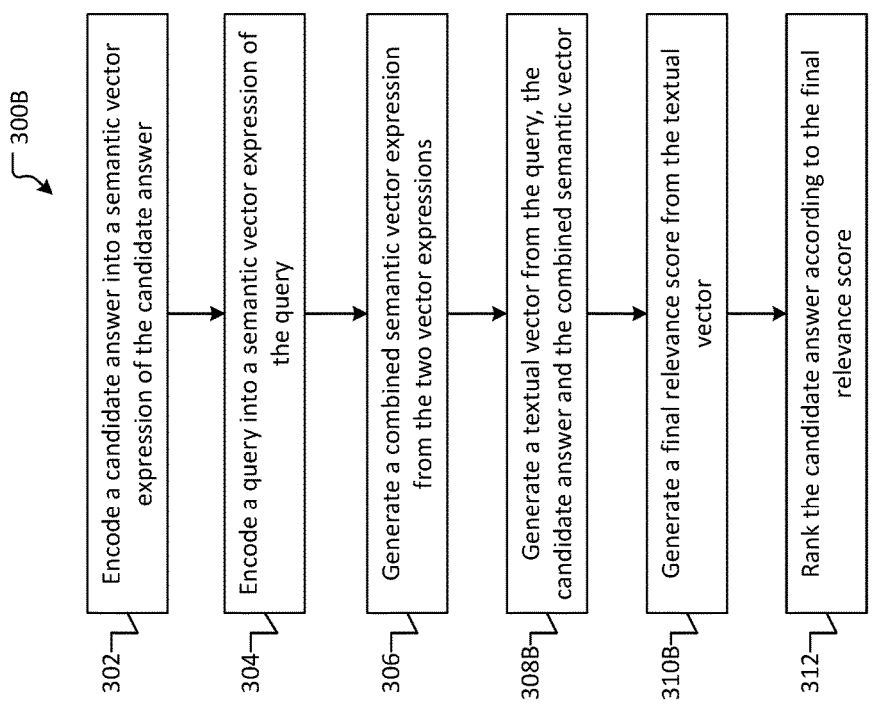
FIG. 3B illustrates a method for ranking candidate answers.

FIG. 3B illustrates a method 300B for ranking candidate answers based on a collection of the candidate answers against a query, according to an alternative example. The method 300B may be performed one or more computing systems. For example, the operations of the method 300B may be performed by a client device, one or more server devices, or a combination of client and server devices. In contrast with the method 300A in FIG. 3A, according to the method 300B, a final relevance score may be generated from the textual vector after generating the textual vector from the query, the candidate answer and the combined semantic vector based on the query and the candidate answer. At encode operation 302, a candidate answer in a natural language expression may be encoded into a semantic vector expression of the candidate answer. For example, a multi-layered RNN may receive the candidate answer in text. For example, a multi-layered RNN used in summary-query decoder 402 may be based on uni-directional GRUs, bidirectional GRUs and uni-directional LSTMs. A common multi-layered RNN may be shared encoding the candidate answer and the query to generate respective semantic vectors. Alternatively, a separate set of multi-layered RNN may be used to generate semantic vector expressions of the query and the candidate answer.

At encode operation 304, a query in a natural language text may be encoded into a semantic vector expression of the query. For example, a multi-layered RNN may be used to receive the query for encoding by processing with respect to semantics of the query. For example, a multi-layered RNN used in summary-query decoder 402 may be based on uni-directional GRUs, bidirectional GRUs and uni-directional LSTMs. A common multi-layered RNN may be shared encoding the candidate answer and the query to generate respective semantic vectors. Alternatively, a separate multi-layered RNN may be used.

At generate operation 306, the two semantic vector expressions from the encoding operation 302 and the encoding operation 304 may be combined to generate a combined semantic vector expression of the two semantic vector expressions. For example, a cosine similarity may be processed for the two semantic vector expressions. In another example, equal or weighted sum or average of the two semantic vector expressions may be used to generate a combined semantic vector expression.

At generate operation 308B, a textual vector expression may be generated from the natural language query, the natural language answer and the combined semantic vector expression. For example, a multi-layered neural network (NN) may be used to generate traditional IR features based on textual analysis. The combined semantic vector expression may be used as an input vector to the multi-layered NN to be processed along with the query and the answer. The textual vector expression may be a multi-dimensional vector.

At generate operation 310B, a final relevance score for the answer may be generated from the textual vector expression. For example, a higher final relevance score for an answer may indicate a higher relevance of the answer against the query. The final relevance score may be a weighted combination of the textual vector expression and the semantic vector expression.

At rank operation 312, a collection of answers may be ranked according to respective final relevance scores. For example, there may be a set of multiple answers for a query. There may be a relevance scores for each of the answers. These answers may be ranked in the order of corresponding relevance scores.

As should be appreciated, operations 302-312 in FIG. 3B are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4A:
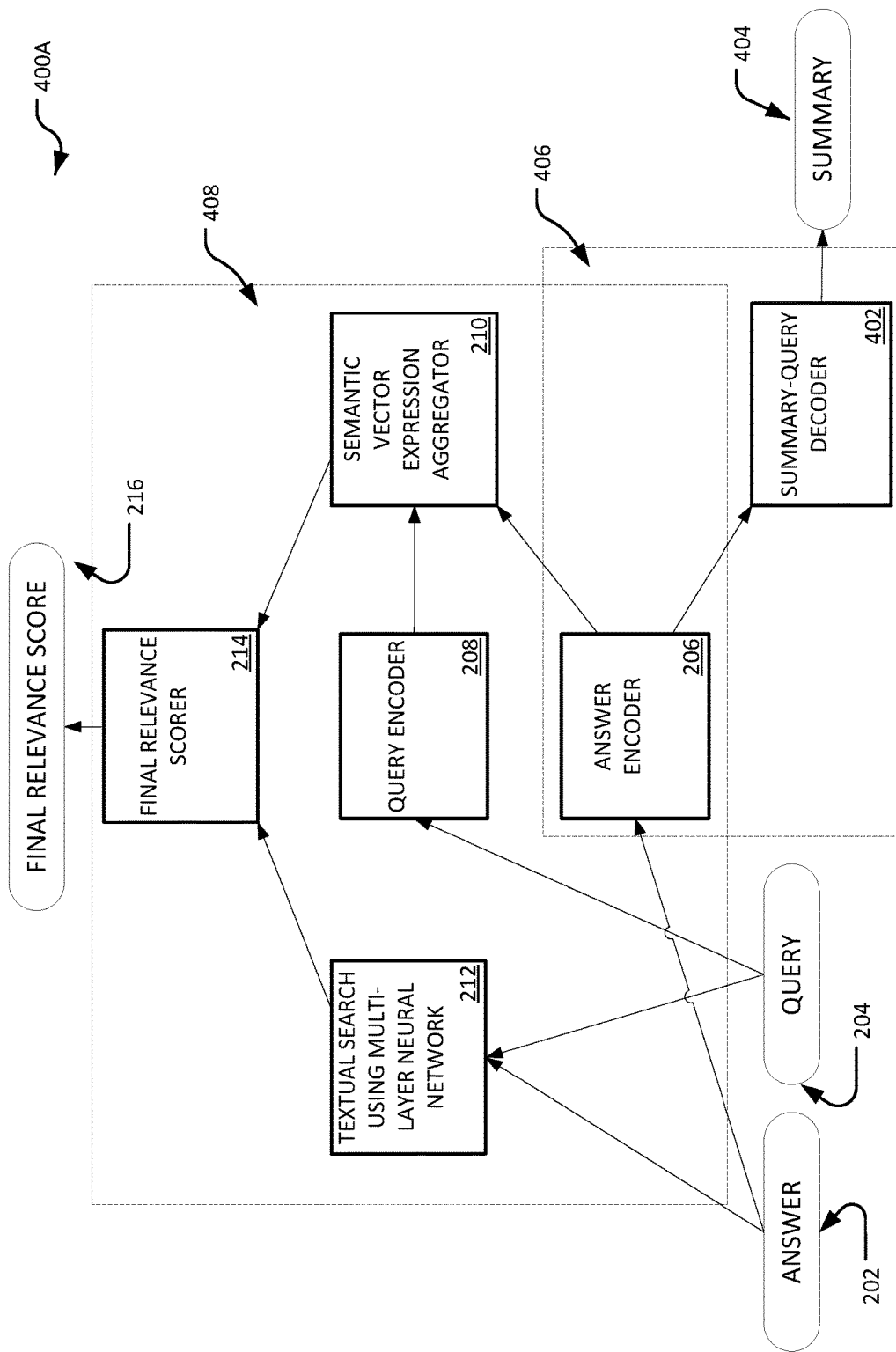
FIG. 4A illustrates an overview of an example system for ranking and summarizing candidate answers based on deep learning using deep learnt neural networks.

FIG. 4A illustrates an overview of an example system 400A for ranking and summarizing candidate answers based on deep learning using deep learnt neural networks. Example system 400A may be a combination of interdependent components that interact to form an integrated whole for performing aspects disclosed herein. In aspects, system 400 may include hardware components (e.g., used to execute/run operating system (OS)), and/or software components (e.g., applications, application programming interfaces (APIs), modules, virtual machines, runtime libraries, etc.) running on hardware. In particular aspects, example system 400A may provide an environment for software components to execute, evaluate operational constraint sets, and utilize resources or facilities of the example system 400A. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 7-10. In other instances, the components of systems disclosed herein may be distributed across and executable by multiple devices.

For example, input may be entered on a client device and information may be processed or accessed from other devices in a network (e.g. server devices, network appliances, other client devices, etc.).

In the certain aspects, summarization subsystem 406 may contain answer encoder 206 and summary-query decoder 402. For example, a natural language summary of an answer 202 may be generated from the answer 202 by the summarization subsystem 406. Additionally, ranking subsystem 408 may contain answer 206, query encoder 208, semantic expression aggregator 210, textual search using multi-layered neural network 212, and final relevance scorer 214. For example, a final relevance score 216 may be generated from a query 204 and an answer 202 by the ranking subsystem 408. In aspects, the answer encoder 206 is shared among the summarization subsystem 406 and the ranking subsystem 408.

In aspects, a natural language summary may be generated based upon a multi-dimensional semantic vector expression of the answer by summary-query decoder 402. Summary-query decoder 402 may consist of a multi-layered recurrent neural network (RNN). Soft neural attention may be used by summary-query decoder 402. For example, a "loose" approximation with attention to general parts within a given answer may be used while decoding the answer, instead of specifically focusing on specific parts of the answer with "hard" attention, in order to minimize perplexity which is the sum of cross entropy errors over all decoded terms.

In aspects, sharing the common answer encoder 206 between the summarization subsystem 406 and the ranking subsystem 408, forming a joint shared neural networks, may synergistically benefit quality of generating both relevance scores and summary passages. A resultant vector from the answer encoder 206 may imply a summary or understanding of the answer in an encoded expression. The rest of deep learnt neural network processing according to the present disclosure relies upon proper understanding of the answer. Training the answer encoder 206 may improve processing through both subsystems.

While not shown in the figures, according to the present disclosure, training the neural networks may include, but is not limited to, alternating the training between the summarization subsystem 406 and the ranking subsystem 408. Training the deep learnt neural networks in the summarization subsystem 406 may minimize perplexity in a sequence-to-sequence task processing, among other benefits. Additionally, training the deep learnt neural networks in the ranking subsystem 408 may maximize a probability of any given pair of answers in the ranking is correct relative to the other pairs, among other benefits. For example, the answer encoder 206, which may be shared by the two subsystems, may receive answers while being trained as a part of the summarization subsystem 406, and may receive answers while being trained as a part of the ranking subsystem 408. According to the present disclosure, the answer encoder 206 may continue to be trained to improve accuracy of generating multi-dimensional semantic vector expression of the answer, regardless of which subsystem is being trained.

In aspects, summary-query decoder 402 may consist of a set of multi-layered RNNs with multiple sequence-to-sequence layers based on different RNN architecture. For example, a multi-layered RNN used in summary-query decoder 402 may be based on uni-directional GRUs, bidirectional GRUs and uni-directional LSTMs. In aspects, all the resultant summaries may be presented as a set of various natural language summaries of the answer 202 to the user, or one summary with the lowest perplexity may be selected for use.

In aspects of the present disclosure, training data sets may comprise various forms, such as but not limited to a <passage, summarized passage> pair and a <passage, question> pair may be used to train the neural networks as represented by answer encoder 206 and summary-query decoder 402 in the summarization subsystem 406.

As should be appreciated, operations in FIG. 4A are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4B:
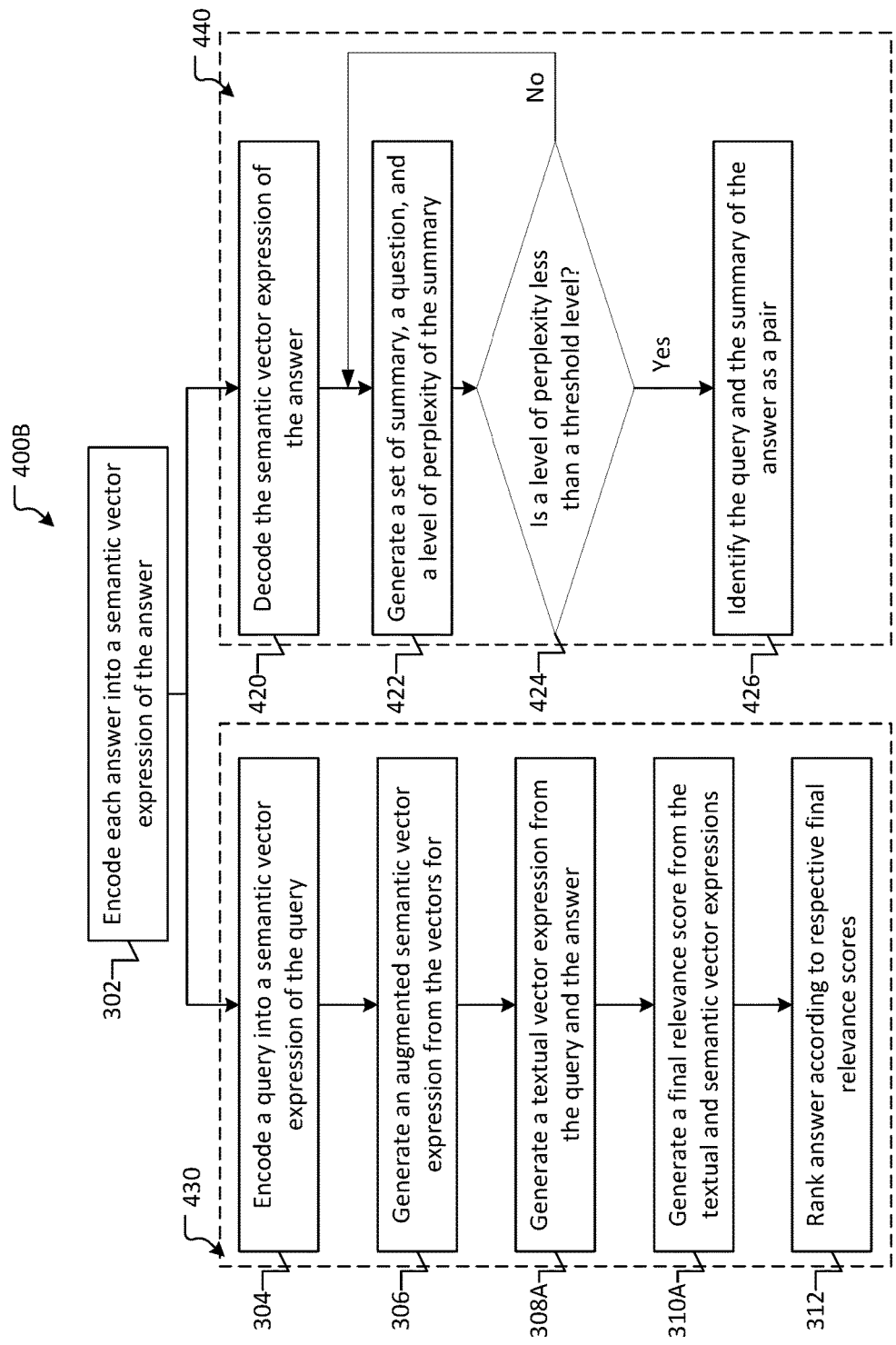
FIG. 4B illustrates a method for ranking and summarizing candidate answers based on deep learning using deep learnt neural networks.

FIG. 4B illustrates a method 400B for ranking and summarizing candidate answers and generating a query as a pair with respective candidate answers based on deep learning using a set of deep learnt neural networks. In aspects the method 400B may contain two sub-methods ranking sub-method 430 and a summarization sub-method 440. For instance, the ranking sub-method 430 may relate to ranking candidate answers against the query according to final relevance scores for respective candidate answers. In addition, the summarization sub-method 440 may relate to generating a summary of the respective candidate answers. In addition, the summarization sub-method 440 may identify a pair of a summary of the answer and a new query that may be generated from the encoded candidate answer.

At encode operation 302, a candidate answer may be encoded into a semantic vector expression of the candidate answer. For instance, the candidate answer may be in a natural language expression. The candidate answer may be obtained as a result of extracting passages from the ranked electronic file. The resulting expression of the answer may be a semantic vector consisting of multiple dimensions, based on the multi-layered recurrent neural network used for the answer encoder 206. In aspects, the encode operation 302 may be a common step before the ranking sub-method 430 and the summarization sub-method 440, sharing the output of the encode operation 302 as input to the respective sub-methods.

At decode operation 420, the semantic vector expression of the answer may be decoded. For instance, the semantic vector expression of the answer may be decoded by using at least one multi-layered recurrent neural network. For example, the multi-layered recurrent neural network (RNN) may be in a variety of architectures, such as but not limited to uni-directional gated recurrent units (GRUs), bidirectional GRUs, uni-directional long short-term memory (LSTMs) and bi-directional LSTMs.

At generate operation 422, a set comprising a summary of the answer, a question, and a level of perplexity of the summary may generated by the multi-layered RNN. Additionally or alternatively, at the generate operation 422, at least one of a summary of the answer, a question and a level of perplexity may be generated. For instance, the generate operation 422 may be processed by a multi-layered RNN with soft neural attention. In aspect, the decode operation 420 and the generate operation 422 may use the same multi-layered RNN with soft neural attention. In another aspect, the level of perplexity may indicate a level of consistency of the decoded summary against the given candidate answer. For instance, perplexity may be generated based on the sum of cross entropy errors over all decoded terms.

At compare operation 424, a level of perplexity is compared against a threshold level. The threshold level may be pre-defined. As should be appreciated, the summary of the candidate answer may need to be simple enough at a low level of perplexity to be useful as a summary of an electronic file. If a level of perplexity is not less than a level of the threshold, then another set of a summary, a question, and a level of perplexity of the summary may be generated at the generate operation 422 using the multi-layered RNN. For instance, sets of summary, a question, and a level of perplexity of the summary may be iteratively generated and compared against the level of threshold until the level of perplexity is below the level of threshold. If a level of perplexity is less than a level of the threshold, then, at identify operation 426, the generated query and the summary of the candidate answer may be identified as a pair.

In examples, a pair of summary of the candidate answer and the generated query may be used to generate a list of Frequently Asked Questions (FAQ) for an electronic file. For instance, the generated query may be a question and the summary of the candidate answer may be its answer in the FAQ. A plurality of passages from a given electronic files may be extracted, and may be processed by the summarization sub-method 440 to generate a pair of a summary and a question for each candidate answer.

As should be appreciated, operations in FIG. 4B are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
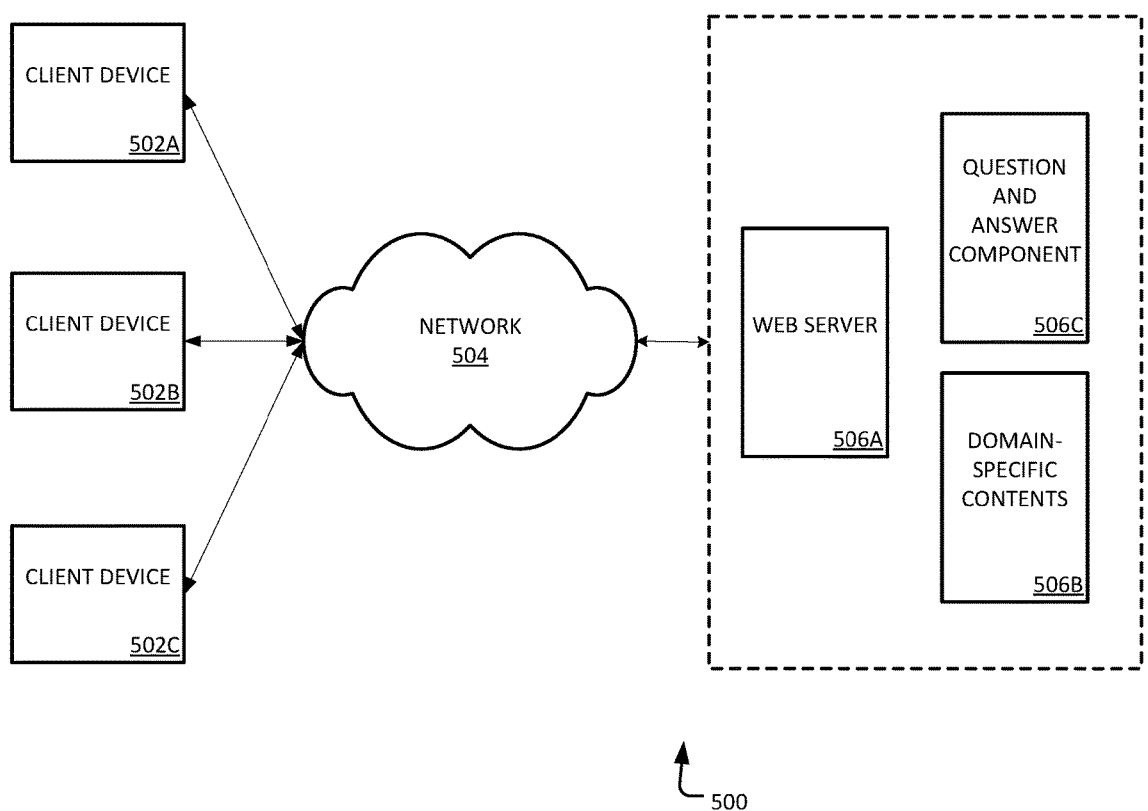
FIG. 5 illustrates an overview of an example system for a third party deployment in specific domains.

FIG. 5 illustrates an overview of an example system 500 for a third party deployment in specific domains. For example, the question and answer system according to the present disclosure may be provided as an online medical guidance system to medical professionals and patients. In aspects, the example system 500 as a question and answer system according to the present disclosure may be provided as an embedded system on a mobile handheld.

As illustrated in FIG. 5, at least one client device 502A is connected to network 504. A set that may consist of any of a webserver 506A, domain-specific contents 506B, and question and answer component 506C may be connected to network 504. Each of client devices 502A, 502B and 502C may include a web browser application, which a user may use to access the web server 506A across the network 504. For example, a user may be using a client device 502A to access a question and answer service that may be provided by the set of web server 506A, domain-specific contents 506B and question and answer component 506C. In particular, for example, the domain-specific contents 506B may contain contents that are specific to medical information. The web server 506A may send the client device 502A a web page where the user may enter a query to search for information on treatments for a medical condition. The web browser on client device 502A may send the query to the web server 506A, which may in turn send the query to the question and answer component 506C. Receiving the query, the question and answer component 506C accesses domain-specific contents 506B, which in this example may be on medical information. The question and answer component 506 may then search for information that is relevant to the domain-specific query such as in the medical domain for example. In aspects, the question and answer component 506C may select a set of electronic files or a set of web contents, which are found by the question and answer component 506C as relevant to the query. The question and answer component 506C may then extract passages from the electronic files or the web contents as candidate answers. Furthermore, the question and answer component 506C may generate a ranking of the electronic files or the web contents based on candidate answers. The question and answer component 506C may also extract candidate answer from the ranked electronic files, and generate a summary of the candidate answer as a summary of the electronic file. The web server 506A then may create a web page that contains both the ranking of relevant web pages and the summary of the ranked electronic file.

As should be appreciated, the various methods, devices, components, etc., described with respect to FIG. 5 are not intended to limit the systems and methods to the particular components described. Accordingly, additional topology configurations may be used to practice the methods and systems herein and/or some components described may be excluded without departing from the methods and systems disclosed herein.

Figure 6:
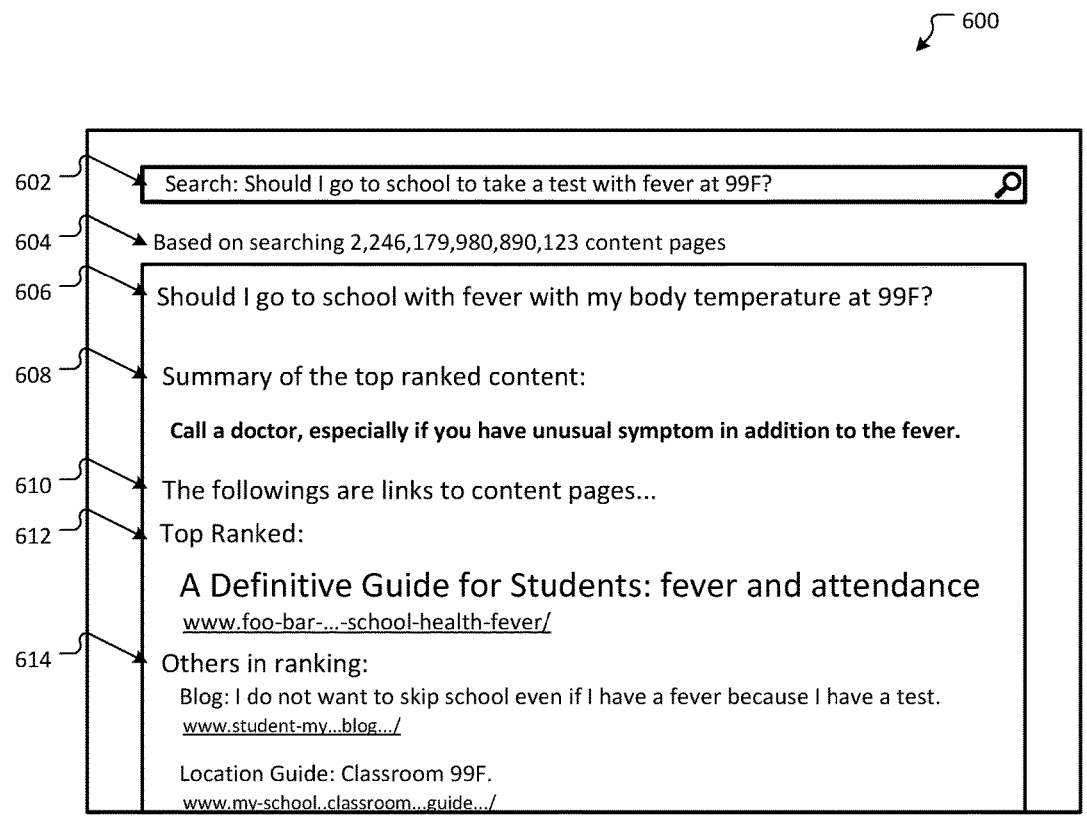
FIG. 6 illustrates a graphical user interface for entering a query and displaying search results, according to an example embodiment.

FIG. 6 illustrates a graphical user interface 600 for entering a query and displaying search results, according to an example. In aspects, the graphical user interface 600 provides one or more fields associated with providing answers to a query "Should I go to school to take a test with fever at 99F?" as an original query. The query may be received through user interactions from the input field 602. In aspects, the interface 600 may include indication of how many content pages have been searched, by displaying "Based on searching 2,246,179,980,890,123 content pages" (e.g. provided in field 604). In aspects, a rephrased query that has been generated along with a summary of candidate answers as a pair: "Should I go to school with fever with my body temperature at 99F?" (e.g. provided in field 606). The summary field 608 may display a summary of the candidate answer that is the most relevant to the original query: "Summary of the top ranked content: Call a doctor, especially if you have unusual symptom in addition to the fever." (e.g. provided in field 608). The interface 600 may include a display field where a list of links to relevant web contents is displayed. For example, following a message "The followings are links to content pages . . . " (e.g. provided in field 610), a title and a link to the top ranked content may be provided. "Top Ranked: A Definitive Guide for Students: fever and attendance www.foo-bar- . . . -school-health-fever/" (e.g. provided in field 612). In aspect the top ranked content may depict an electronic file that is the most relevant to the original query. The content page may indicate a link to the electronic file as a content. The summary as provided in field 606 may be a summary text of the top ranked web content for which title and a link is as provided in field 612. In aspects, a list of ranking with titles and links to other relevant web contents may be listed in an others ranking (e.g., provided in field 614).

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
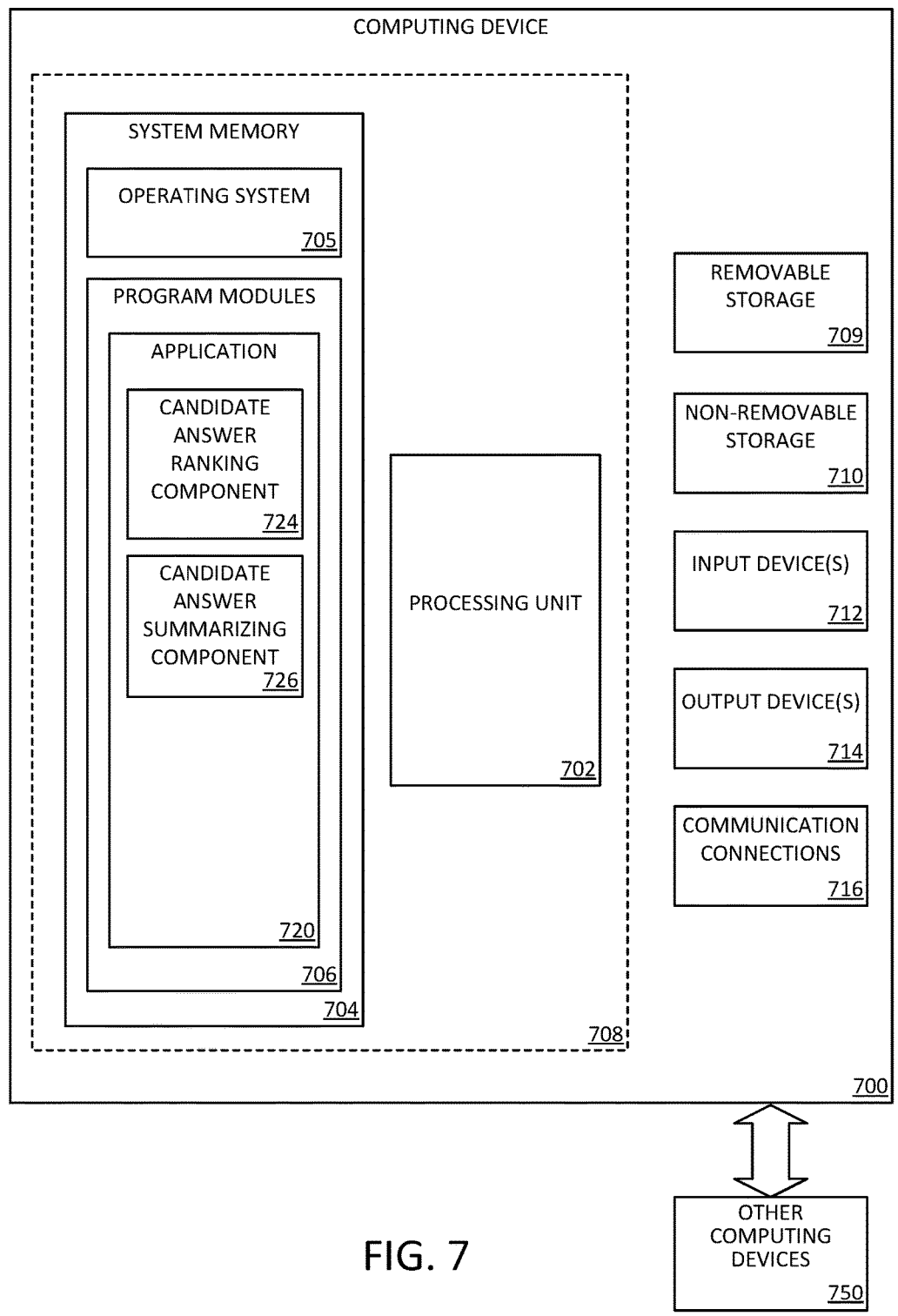
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as candidate answer ranking component 724 and candidate answer summarizing component 726. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
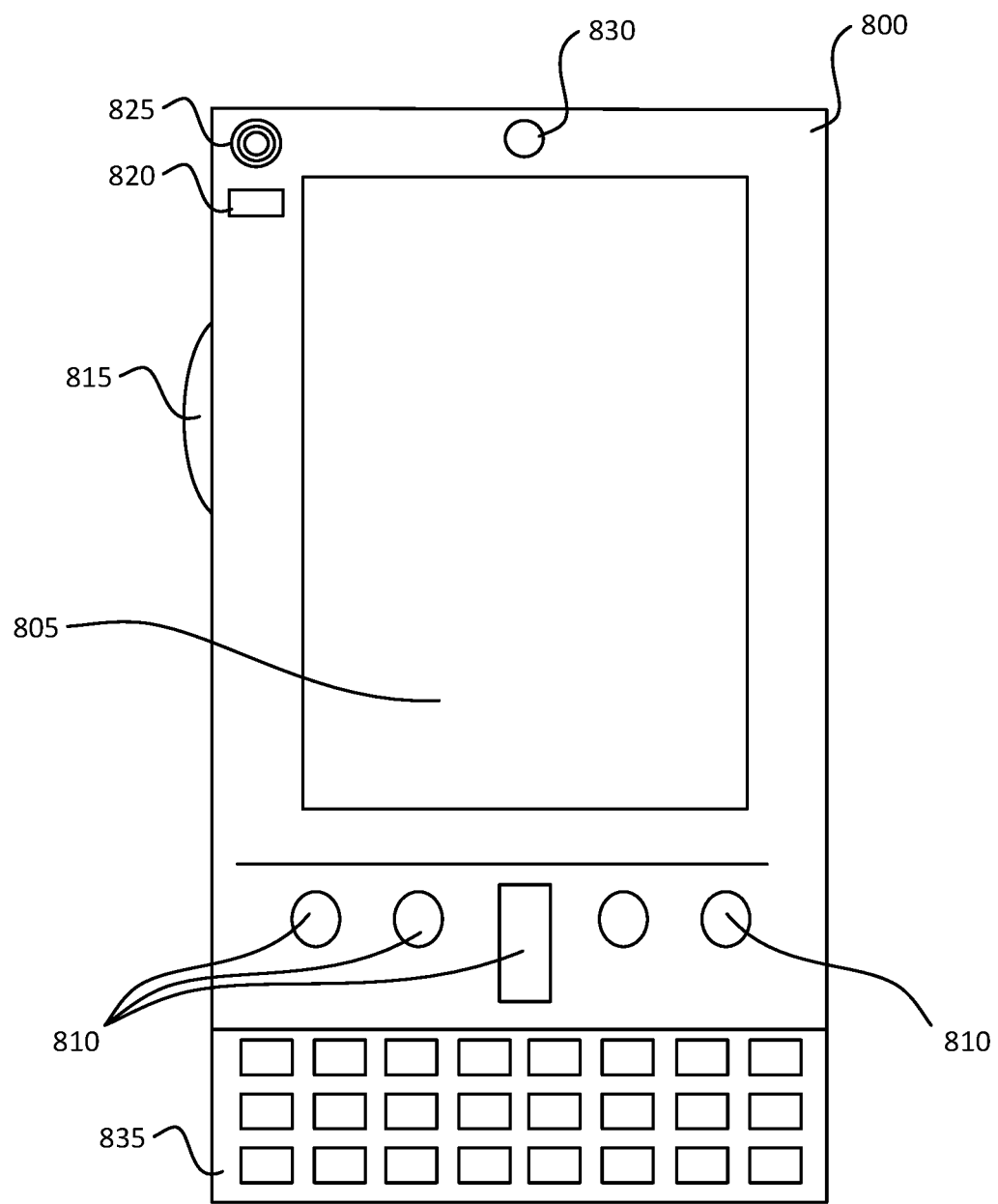
FIGS. 8A and 8B are simplified block diagrams of a mobile computing device with which aspects of the present disclosure may be practiced.
Figure 8B:
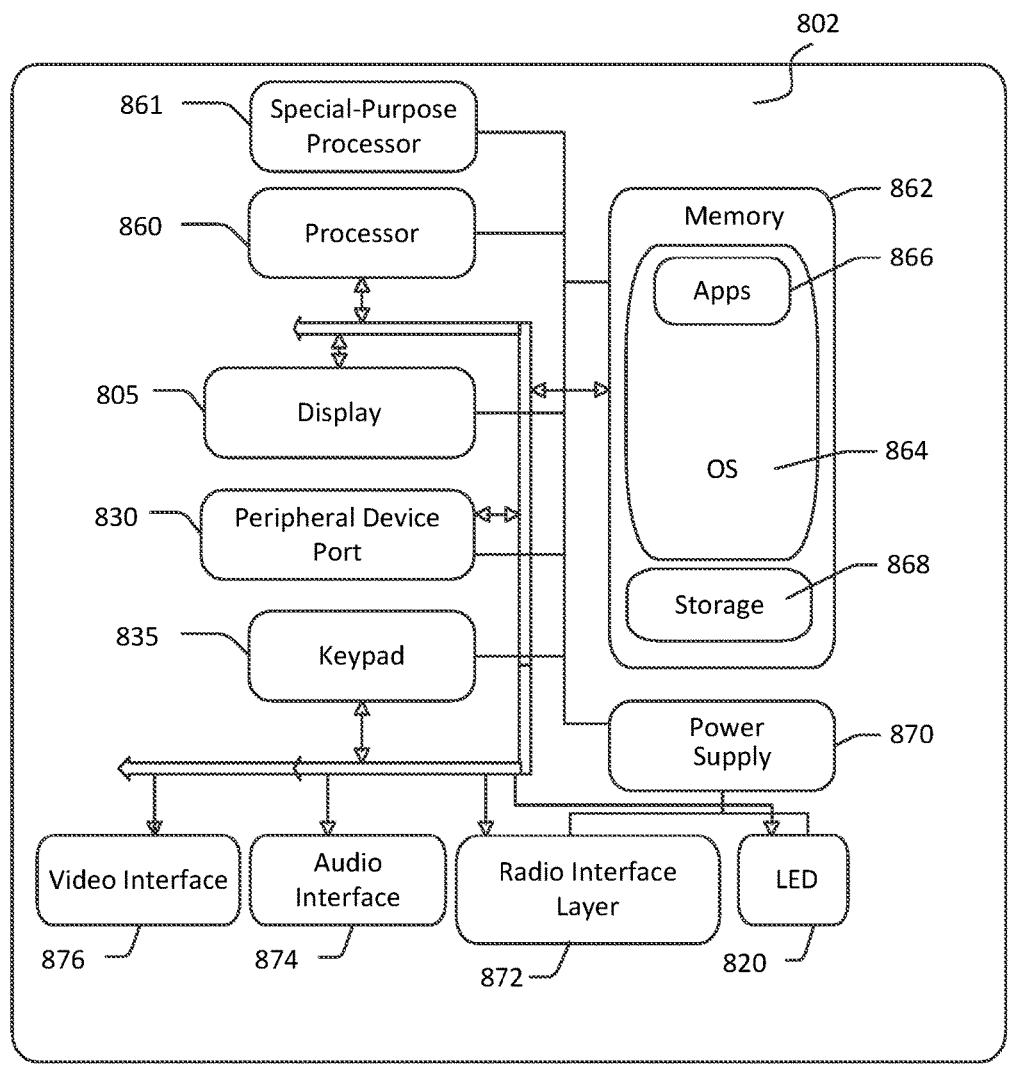

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
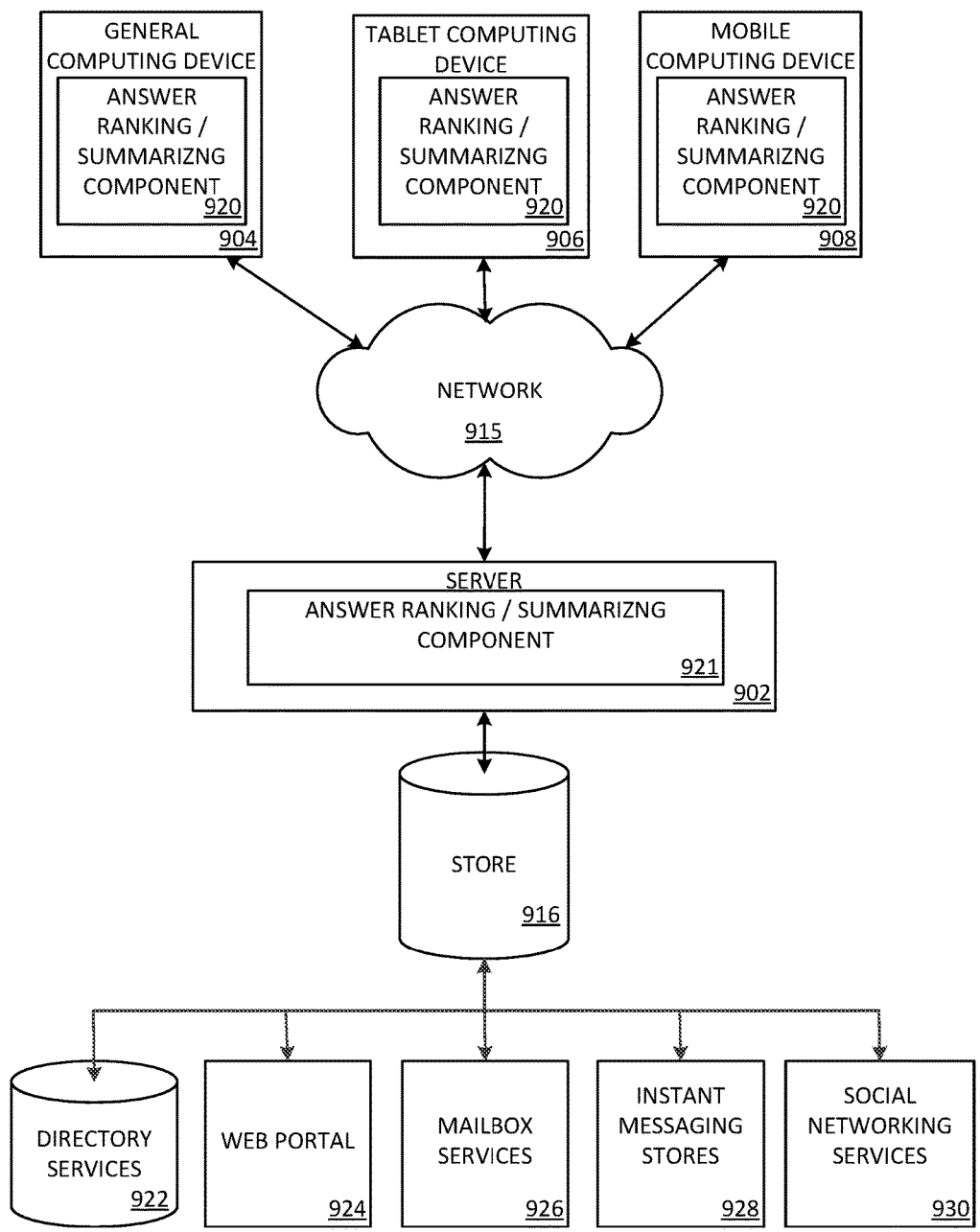
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Answer ranking/summarizing component 920 may be employed by a client that communicates with server device 902, and/or answer ranking/summarizing component 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
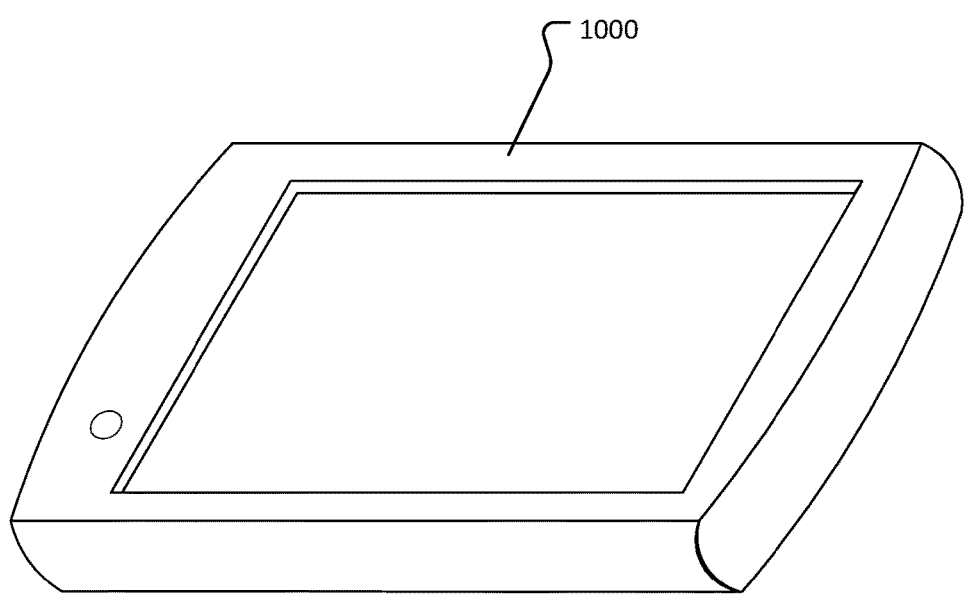
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory encoding computer executable instructions that, when executed by the at least one processor, perform a method for generating a relevance score on a natural language candidate answer to a natural language query for one or more electronic files, the method comprising:
   generating a first semantic vector expression, wherein the first semantic vector represents data for semantic features of the natural language query;
   generating a second semantic vector expression, wherein the second semantic vector represents data for semantics features of the natural language candidate answer;
   generating a combined semantic vector expression based on at least one dimension of each of the first semantic vector expression and the second semantic vector expression using one or more multi-layered recurrent neural networks, wherein the combined semantic vector expression represents a data structure for semantic characteristics of the natural language query and the natural language candidate answer;
   generating a textual vector expression based on a pair of the natural language query and the natural language candidate answer using a multi-layered neural network as textual analyzer, wherein the textual vector expression represents textual features of the pair of the natural language query and the natural language candidate answer, wherein the textual features comprise a degree of matching between the pair based on appearance of words;
   generating a relevance score based on the combined semantic vector expression and the textual vector expression using a relevance score generator based on a weighted combination of coefficient values of at least one dimension of the combined semantic vector expression and the textual vector expression; and
   providing the relevance score for ranking the natural language candidate answer to the natural language query.

2. The system of claim 1, the method further comprising:
   generating a natural language summary passage based on a semantic vector expression of the candidate answer using a multi-layered sequence-to-sequence recurrent neural network with soft neural attention as a decoder.

3. The system of claim 1, the method further comprising:
   iteratively generating at least in part a set of a natural language summary passage, a natural language question, and a level of perplexity, based on the semantic vector expression of the candidate answer until the level of perplexity is less than a threshold level.

4. The system of claim 3, wherein the at least a set of a natural language summary passage, a natural language question and a level of perplexity is generated using a multi-layered sequence-to-sequence recurrent neural network with software neural attention as a decoder.

5. The system of claim 3, wherein the method further comprises:
   when the level of perplexity is less than the threshold level, providing the natural language summary passage and the natural language question as a pair.

6. The system of claim 1, the method further comprising:
   receiving the natural language query;
   selecting one or more electronic files;
   selecting a natural language passage from at least one of the selected electronic files as a natural language candidate answer before generating a combined semantic vector expression.

7. A system comprising:
   at least one processor; and
   a memory encoding computer executable instructions that, when executed by the at least one processor, perform a method for generating a relevance score on a natural language candidate answer to a natural language query for one or more electronic files, the method comprising:
   receiving a natural language query;
   generating a first semantic vector expression based on a natural language query using a first encoder;

generating a second semantic vector expression based on the natural language candidate answer using a second encoder;

generating a textual vector expression based on a pair of the natural language query and the natural language candidate answer using a textual analysis system, wherein the textual vector expression represents textual characteristics of a pair of the natural language query and the natural language candidate answer, wherein the textual characteristics comprise a degree of matching between the pair based on appearance of words;

generating a third semantic vector expression based on the first semantic vector expression and the second semantic vector expression using a comparator;

generating a relevance score based on the third semantic vector expression and the textual vector expression using a relevance score generator; and providing the relevance score for ranking the natural language candidate answer to the natural language query.

8. The system of claim 7, wherein the relevance score generator generates a score based on a weighted combination of the third semantic vector expression and the textual vector expression.

9. The system of claim 7, the method further comprises:
receiving the natural language query;
selecting one or more electronic files;
selecting a natural language passage from the each of the selected electronic files as the candidate answers; and
providing a rank of the candidate answer according to the generated relevance score.

10. The system of claim 7, wherein the method further comprises:
generating a natural language summary passage based on the second semantic vector expression using a decoder, wherein the decoder is a summary-question decoder comprising a multi-layered recurrent neural network, and wherein the score generator generates a score based on a weighted combination of the third semantic vector expression and the textual vector expression.

11. A computer-implemented method comprising:
generating a combined semantic vector expression based on at least one dimension of each of the first semantic vector and the second semantic vector using one or more multi-layered recurrent neural networks, wherein the combined semantic vector expression represents semantic characteristics of the paired natural language query and the natural language candidate answers;

generating a textual vector expression based on a pair of the natural language query and the natural language candidate answer using a multi-layered neural network as textual analyzer, wherein the textual vector expression represents textual characteristics of the pair of the natural language query and the natural language candidate answer, wherein the textual characteristics comprise a degree of matching between the pair based on appearance of words;

generating a relevance score based on the combined semantic vector expression and the textual vector expression using a relevance score generator; and providing the relevance score for ranking the natural language candidate answer to the natural language query.

12. The computer-implemented method of claim 11, further comprising:
generating a natural language summary passage based on a semantic vector expression of the natural language candidate answer using a multi-layered sequence-to-sequence recurrent neural network with a decoder.

13. The computer-implemented method of claim 11, the method further comprising providing a rank of the natural language candidate answer according to the generated relevance score.

14. A computer-implemented method of claim 11,
wherein generating the combined semantic vector comprises generating a first semantic vector expression based on the natural language query using a first encoder, and generating a second semantic vector expression based on the natural language candidate answer using a second encoder, and
wherein generating the relevant score comprises generating a third semantic vector expression based on the first semantic vector expression and the second semantic vector expression using a comparator, and generating the relevance score based on the third semantic vector expression and the textual vector expression using a relevance score generator.

15. The computer-implemented method of claim 14, wherein the relevance score generator generates a score based on a weighted combination of the third semantic vector expression and the textual vector expression.

16. The computer-implemented method of claim 14, the method further comprising generating a natural language summary passage based on the second semantic vector expression using a decoder.

17. The computer-implemented method of claim 16, wherein the decoder is a summary-question decoder comprising a multi-layered recurrent neural network with soft neural attention, and wherein the score generator generates a score based on a weighted combination of the third semantic vector expression and the textual vector expression.

18. The computer-implemented method of claim 17, wherein the soft neural attention comprises generating a summary using words with high weights.

19. The computer-implemented method of claim 16, the method further comprising:
providing the generated summary passage; and
providing a rank of the candidate answer according to the generated relative score.

20. The computer-implemented method of claim 16, the method further comprising:
generating a level of perplexity of the natural language summary passage based on the second semantic vector expression using the decoder;
generating a question based on the second semantic vector expression using the decoder; and
identifying the generated summary passage and the generated question as a summary-question pair when the level of perplexity of the natural language summary passage is less than a threshold level.

* * * * *